United States Patent

[11] 3,601,378

| [72] | Inventor | Vernon J. Hurst<br>Athens, Ga. |
|---|---|---|
| [21] | Appl. No. | 843,535 |
| [22] | Filed | July 22, 1969 |
| [45] | Patented | Aug. 24, 1971 |
| [73] | Assignee | J. M. Huber Corporation<br>Locust, N.J. |

[54] CONTINUOUS HYDROTHERMAL APPARATUS AND PROCESS
5 Claims, 1 Drawing Fig.

[52] U.S. Cl. .................................................. 263/36,
23/110, 263/52
[51] Int. Cl. ..................................................... F26b 9/02
[50] Field of Search............................................. 263/36, 37,
38, 39, 52, 53; 23/290.5

[56] References Cited
UNITED STATES PATENTS

| 3,301,691 | 1/1967 | Hemstock et al. ............ | 106/72 |
|---|---|---|---|
| 2,688,606 | 9/1954 | Schmitt et al. ................ | 23/290.5 |

*Primary Examiner*—John J. Camby
*Attorney*—Harold H. Flanders

ABSTRACT: A continuous hydrothermal reactor for processing slurries at low velocity gradients capable of operating at up to approximately 1000° C. and up to approximately 30,000 pounds per square inch is disclosed.

PATENTED AUG 24 1971
3,601,378
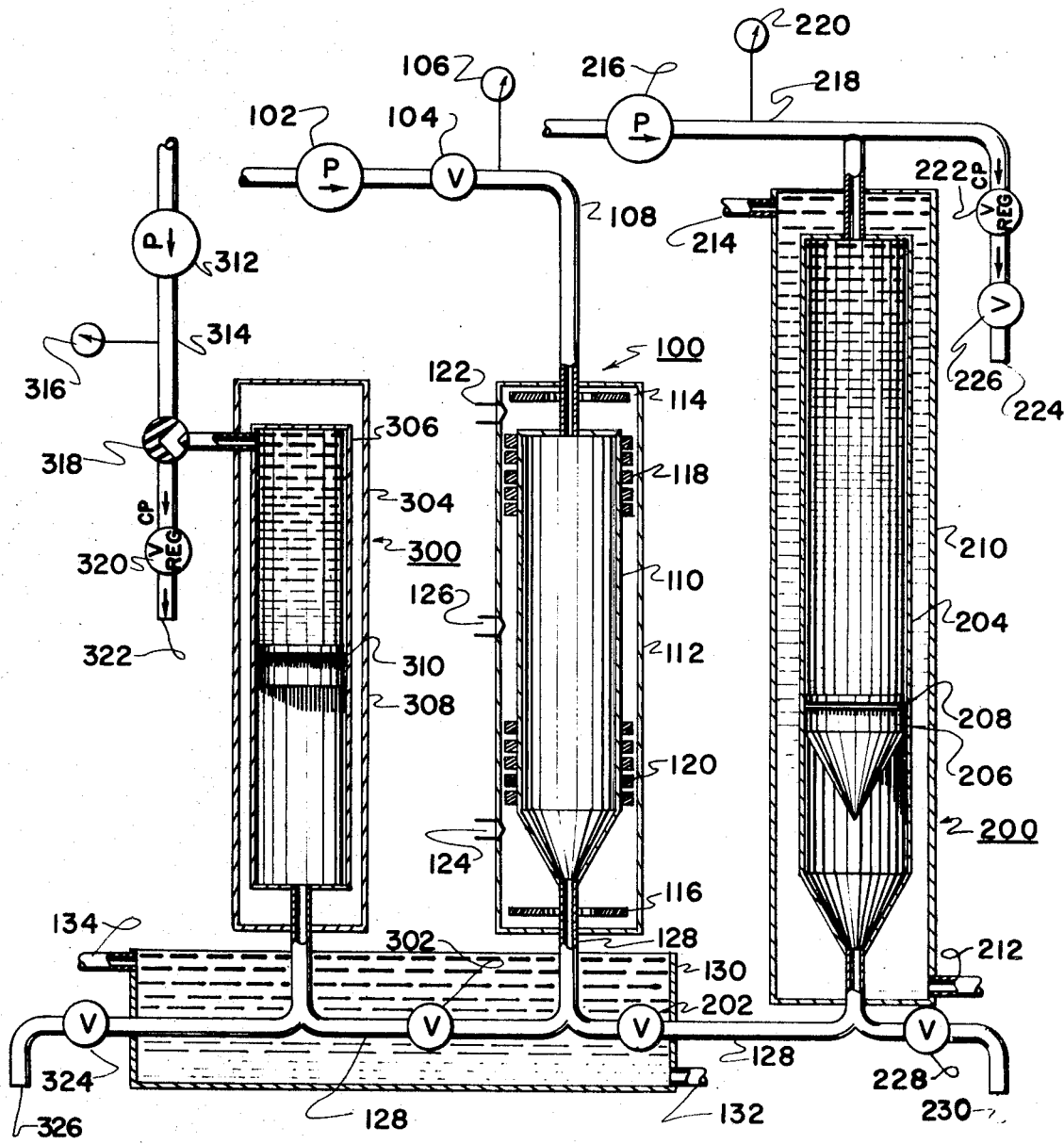
INVENTOR
VERNON J. HURST
BY Harold W. Flanders
ATTORNEY 3,601,378

CONTINUOUS HYDROTHERMAL APPARATUS AND PROCESS

CROSS-REFERENCES CROSS-REFERENCE TO RELATED APPLICATIONS

A copending application, Ser. No. 843,656, filed July 22, 1969, entitled "Viscosity Reduction of Kaolin by Hydrothermal Treatment", filed of even date with the present application by the present inventor describes a specific use for the "Continuous Hydrothermal Apparatus and Process" of the present application.

BACKGROUND OF THE INVENTION

1. Field of the Invention

The present invention relates, in general, to a hydrothermal reaction process and apparatus therefore and, more particularly, to continuous hydrothermal reaction apparatus and method for the processing and treatment of slurries containing clays and the like to alter their phase structure and/or dissolve selected components.

2. Description of the Prior Art

Many materials capable of being slurried are sold under rigid specifications on properties such as viscosity, particle size, brightness, and the like. Natural variations in the properties of materials, such as kaolin clays, are common as a result of variations in mineral composition, particle size, particle shape, and particle size distribution. Within limits it is possible to alter the properties of materials capable of being slurried by processing techniques such as shear, fractionation, blending, and the use of chemical reagents.

Hydrothermal treatment of materials to alter their properties has recently received attention as a means of extending the range of useful modification of such materials, for example, see Applicant's copending application entitled "Viscosity Reduction of Kaolin by Hydrothermal Treatment", Ser. No. 843,656, filed July 22, 1969. In addition other beneficial results such as the growth of new crystalline phases, reductions in viscosities, and alteration in particle size and distribution are obtainable by hydrothermal treatment.

However, attempts to operate conventional equipment continuously for hydrothermal treatments have been troubled by frequent blockages, and an inability to maintain constant temperature and pressure conditions within the reaction apparatus. Further, the prior art methods of commercial batch treating have required long times in the heating cycle and long times in the cooling cycle, so that short reaction times were not feasible.

SUMMARY OF THE INVENTION

Accordingly, it is an object of the present invention to provide a new, rugged, trouble-free, and highly effective continuous hydrothermal reaction apparatus and method for its use which overcomes the deficiencies of the prior art as described above.

It is a further object of the present invention to provide a continuous hydrothermal reactor in which the temperature and pressure may be carefully stabilized and controlled.

Another object of the present invention is to provide a hydrothermal reactor and process capable of continuous hydrothermal treatment and processing of slurries at low pressure differentials so that the shear forces acting on the clay crystals in the slurry as a result of apparatus configuration are minimized.

An additional object of the present invention is to provide a hydrothermal reactor capable of resisting corrosion, not subject to frequent blockages and generally capable of trouble-free continuous operation.

A further object of the present invention is to provide a hydrothermal reaction apparatus which will permit materials to be subjected to high temperatures and high pressures for short periods of time in large volumes.

An additional object of the present invention is to provide a hydrothermal reaction apparatus and process which will allow the material to be continuously introduced, maintained, and withdrawn under high pressure with low shear.

Other objects and a fuller understanding of the present invention may be had by referring to the following description and claims taken in conjunction with the accompanying drawings.

The present invention overcomes the deficiencies of the prior art and achieves its objectives by providing a central reaction vessel and a plurality of condenser-exchangers each of which condenser-exchangers contains a back pressure plunger. These vessels are connected by suitable tubing having no sharp bends and through valves which present no small orifices to increase shear to a water backpressure system which allows for movement of the material to provide continuous processing.

BRIEF DESCRIPTION OF THE DRAWING

In order to facilitate the understanding of the present invention, reference will now be made to the appended drawing of a preferred embodiment of the present invention. The drawing should not be construed as limiting the invention but is exemplary only. In the drawing:

The FIGURE is a partial cross-sectional schematic representation of the hydrothermal reaction apparatus of the present invention.

DESCRIPTION OF THE PREFERRED EMBODIMENT(S)

A preferred embodiment of the present invention is shown in the accompanying Figure in which 100 generally indicates the central hydrothermal reactor. One of a plurality of condenser-exchanges is indicated at 200 while another condenser-exchanger is indicated at 300.

A high pressure pump 102 serves to feed a slurry through valve 104, past pressure gauge 106 via tubing 108 into a hydrothermal reaction vessel 110 having a volume of approximately 175 cubic centimeters inside of insulated jacket 112 of the hydrothermal reactor 100.

The hydrothermal reaction vessel 110 may be heated by circular end heaters 114 and 116 having a power of 1000 watts each and by five strip heaters 118 having a power of 500 watts each at the top and by five additional strip heaters 120 having a power of 500 watts each at the bottom.

The temperature of the hydrothermal reaction vessel 110 may be measured by thermocouples 122, 124 and 126 placed as shown in the accompanying figure. The temperature of the hydrothermal reaction vessel 110 may be adjusted in response to the readings of the thermocouples 122, 124, and 126 by adjusting the power applied to each of the heating elements making up 114, 116, 118, and 120.

Tubing 128 serves to transport slurry to either condenser-exchanger 200 through valve 202 or to condenser-exchanger 300 through valve 302.

Tank 130 is provided with circulating water for cooling tubing 128 and valves 202 and 302 by means of inlet 132 and outlet 134.

Condenser-exchanger 200 comprises an inner condenser-exchanger vessel 204 having a volume of approximately 4360 cubic centimeters. Within the inner condenser-exchanger vessel 204 is a movable plunger 206 which is sealed to the walls of the inner condenser-exchanger vessel 204 by rings 208 having the same coefficient of thermal expansion as the walls of the inner condenser-exchanger vessel 204.

Inner condenser-exchanger is water cooled by a flow of water between the walls of water jacket 210 and the outer walls of inner condenser-exchanger vessel 204. The flow of water within the water jacket 210 is maintained by a flow through inlet 212 and out of outlet 214.

A high pressure water pump 216 may be employed to force water through tubing 218 past pressure gauge 220 to produce pressure against the top surface of plunger 206.

A constant inlet pressure needle valve 222 on tubing 218 may be utilized to bleedoff water in the upper portion of condenser-exchanger vessel 204. The flow of the water discharge through water discharge outlet 224 on tubing 218 may be further controlled by valve 226.

The discharge of reacted slurry may be controlled by valve 228 prior to slurry discharge outlet 230.

Tubing 128 also allows for the passage of slurry through valve 302 to condenser-exchanger 300 which also may have a water jacket 304 on the outside of an inner condenser-exchanger vessel 306 having a volume of approximately 245 cubic centimeters.

Within the inner condenser-exchanger vessel 306 is a movable plunger 308 which is sealed to the walls of the inner condenser-exchanger vessel 306 by sealing rings 310 having a like coefficient of linear expansion to that of the walls of inner condenser-exchanger vessel 306.

A high pressure water pump 312 may be utilized to force water through tubing 314 past pressure gauge 316 and through valve 318 into the top of inner condenser-exchanger vessel 306 applying pressure to the top of plunger 308.

Water may be bled off through valve 318 and through constant inlet pressure needle valve 320 to water discharge outlet 322.

Reacted slurry may be discharged through valve 324 through the slurry discharge outlet 326.

While specific pumps, tubing, valving, thermocouples, gauges, and vessel volumes have been referred to throughout as a part of the preferred embodiment of the present invention it is obvious to one of ordinary skill in the art that many other obvious equivalent means and configurations may be employed.

In the preferred embodiment the reactor vessels and fixtures are preferably constructed of titanium aluminum alloys noted for their strength, stability and resistance to corrosion under the operating conditions of temperature and pressure. The condenser-exchanger vessels may be made of stainless steel. It is obvious that any suitable material exhibiting the above described strength, stability and corrosion resistance under the operating conditions of high temperature and pressure may be employed. Typical materials illustrating high strength and corrosion resistance under high temperature and pressure operating conditions are titanium, aluminum, titanium-aluminum alloys, titanium-aluminum-vanadium alloys, waspalloy and 404 stainless steel.

The control of heat input and of operating pressures may be automatically controlled to the extent desired and warranted by the economics of commercial operations.

In operation, the central hydrothermal reaction vessel 110 is heated to temperatures up to 1000° C. by means of end heaters 114 and 116 and strip heaters 118 and 120 while the chamber of the reaction vessel 110 is filled with water from high pressure pump 102 passing through tubing 108 and valve 104. The reactor vessel 110 is brought to operating conditions of temperature up to approximately 1000° C. and pressures on the order of and up to 30,000 pounds per square inch before any further processing on a slurry is begun.

A slurry of clay or other desired material is then pumped into the reaction vessel 110 by the high pressure pump 102, through valve 104. The pressure is monitored by pressure gauge 106 and maintained at a steady value both during the introduction of the slurry and throughout the subsequent processing. The high-pressure pump 102 is built so that it maintains a steady preset pressure at all times. The slurry is introduced at the top of the reactor vessel 110 while simultaneously withdrawing the water or whatever other material was in the reactor vessel 110 through valve 202. Note that at this time the valves 104 and 202 are open. The pressure is maintained on the slurry in front of valve 104 by high pressure pump 102.

During this process water which filled condenser-exchanger vessel 204 above plunger 206 is bled off through the needle valve 222 and valve 226. The reaction time is regulated by the rate of bleedoff of the water through needle valve 222. The rate of flow is maintained so that the hot vapors from the reactor vessel 110 are condensed in the tubing 128 surrounded by cold water in the water tank 130. The rate of flow is adjusted so that the transmit time from the top of reaction vessel to the bottom of reaction vessel is equal to the desired reaction time. For example, a bleedoff rate of 12.3 cubic centimeters per minute will cause the slurry to pass through the reaction vessel 110 with a volume of about 173 cubic centimeters in approximately 14 minutes.

After the reaction vessel 110 has been completely filled with the slurry, by withdrawing the water in a controlled fashion through valve 202, the rate of flow of the slurry through the reactor is thereafter maintained by releasing the water in a controlled fashion from above the plunger 206 in the condenser-exchanger vessel 204 through needle valve 222. At the start the plunger 206 is close to or at the bottom of the condenser-exchanger 204. As the slurry material passes through the reaction vessel 110 and into the condenser-exchanger vessel 204 the plunger 206 moves toward the top of the condenser-exchanger vessel 204.

After condenser-exchanger 204 has been filled to a large extent with slurry, the valve 202 is closed and the valve 302 simultaneously opened. At this point the plunger 308 in condenser-exchanger vessel 306 is at the bottom of the vessel 306. As water is bled off through the needle valve 320, the reacted slurry now enters condenser-exchanger vessel 306.

While condenser-exchanger vessel 306 is being filled, condenser-exchanger vessel 204 can be emptied through valve 228 by pumping water in through the high pressure pump 216 and thereby driving the plunger 206 back to the bottom of the condenser-exchanger vessel 204. As soon as condenser-exchanger vessel 204 has been emptied valve 302 may close at the same time valve 202 is opened. While condenser-exchanger vessel 204 is being filled, condenser-exchanger vessel 306 can be discharged through valve 324 by pumping in water from high pressure pump 312 through valve 318 to drive the plunger 308 in the condenser-exchanger vessel 306 back down to the bottom of vessel 306.

The above cycling may be repeated as many times as desired and in this manner produce a continuous passage of the slurry through the reactor vessel 110.

The rate of heating around the reactor vessel 110 by elements 114, 116, 118, and 120 can be adjusted to maintain the continuously flowing and reacting slurry at a desired uniform temperature.

The above described apparatus permits a continuous flow of slurry to be subjected to high temperatures and pressures for any period of time ranging from a couple of minutes to hours.

The apparatus of the present invention has no sharp bends or corners through which the slurry must pass thereby eliminating a major source of blockages and providing for trouble-free continuous operations.

The present invention enables one to introduce suspended clay particles or similar slurried materials under high pressures up to approximately 30,000 pounds per square inch, to be reacted at a constant high temperature up to approximately 1000° C. and to withdraw the slurried material from the reactor and return it to atmospheric pressure without the necessity of passing the slurried materials through such a small orifice as might disrupt the slurried particles mechanically and increase shear on the particles.

The apparatus of the present invention is exceptional in that it permits a continuous flow of slurried materials to be subjected to high temperatures and high pressures for controllably short periods of time in large volumes without encountering many of the traditional problems associated with hydrothermal treatments.

The provision for a wide range of flow rates and features which enable the slurry to be subjected to short thermal exposures and low reaction times produce a more efficient and economic process than heretofor possible.

The above described apparatus also enables one to produce a product which is largely unaffected by intermediate products.

It should be noted that the above described apparatus allows for the use of backpressure without mechanically altering or deforming the crystals in their flow through the apparatus.

The backpressure may be provided by any suitable combination of engineering expedients which will operate within the limitations as described above.

The condenser-exchanger means may include any suitable apparatus for collecting the reaction products, including but in no way limited to means for flash drying of the slurry.

While the invention has been described with reference to its preferred embodiments, it will be understood by those skilled in the art that various changes may be made and equivalents may be substituted for elements thereof without departing from the true spirit and scope of the invention. In addition many modifications may be made to adapt a particular situation or material to the teachings of the invention without departing from the scope of its essential teachings.

WHAT I CLAIM IS:

1. A continuous hydrothermal reactor for processing slurried materials at low velocities and at low velocity gradients comprising a metallic noncorrosive, nonreactive reaction chamber for receiving a flow of unreacted slurry, means for forcing a flow of said slurry through said reaction chamber against a restraining pressure, means for heating said reaction chamber to temperatures up to approximately 1000° C., condenser-exchanger means, backpressure means to maintain a constant restraining pressure on said slurry up to approximately 30,000 pounds per square inch, means for transporting said slurry from said reaction chamber to said condenser-exchanger means, and means for continuously removing said condensed, reacted portion of said slurry from said condenser-exchanger means.

2. The continuous hydrothermal reactor of claim 1 in which said reaction chamber is constructed of a titanium-aluminum alloy.

3. The continuous hydrothermal reactor of claim 1 in which said condenser-exchanger means comprises a plurality of water cooled condenser chambers.

4. The continuous hydrothermal reactor of claim 3 wherein each condenser chamber includes a movable plunger separating said condenser chamber into two compartments by means of sealing rings having substantially the same coefficient of thermal expansion as the walls of said condenser chamber and wherein backpressure means, including means to bleedoff said backpressure, are applied to one side of said movable plunger to provide a controllable resistance to the flow of said slurry into said condenser chamber.

5. A method of continuous hydrothermal treatment of slurried materials at low velocities and at low velocity gradients comprising:
 1. continuously flowing an unreacted slurry into a nonreactive reaction chamber against a restraining pressure,
 2. heating said slurry in said reaction chamber to a predetermined temperature up to approximately 1000° C.,
 3. simultaneously applying a pressure up to approximately 30,000 pounds per square inch, to resist the flow of said slurry from and through said reaction chamber,
 4. transporting said slurry from said reaction chamber to a condenser chamber against a backpressure,
 5. cooling and decreasing the pressure on said slurry, and
 6. removing said slurry from said condenser chamber.